(12) United States Patent
Grancharov

(10) Patent No.: US 8,583,423 B2
(45) Date of Patent: Nov. 12, 2013

(54) METHOD AND ARRANGEMENT FOR PROCESSING OF SPEECH QUALITY ESTIMATE

(75) Inventor: Volodya Grancharov, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 268 days.

(21) Appl. No.: 13/108,319

(22) Filed: May 16, 2011

(65) Prior Publication Data

US 2011/0313758 A1  Dec. 22, 2011

Related U.S. Application Data

(60) Provisional application No. 61/345,255, filed on May 17, 2010.

(51) Int. Cl.
*G10L 19/00* (2013.01)
*H04R 29/00* (2006.01)
*G01R 29/26* (2006.01)

(52) U.S. Cl.
USPC ............ 704/200.1; 704/226; 381/56; 702/69

(58) Field of Classification Search
None
See application file for complete search history.

(56) References Cited

U.S. PATENT DOCUMENTS

| 6,330,428 | B1 * | 12/2001 | Lewis et al. ................ 455/67.11 |
| 7,844,450 | B2 * | 11/2010 | Leonhard ...................... 704/200 |
| 7,856,355 | B2 * | 12/2010 | Kim ............................. 704/228 |
| 2006/0200346 | A1 | 9/2006 | Chan et al. |
| 2011/0119039 | A1 * | 5/2011 | Grancharov et al. ............ 703/2 |
| 2012/0116759 | A1 * | 5/2012 | Folkesson et al. ............ 704/226 |

FOREIGN PATENT DOCUMENTS

| WO | 2007089189 A1 | 8/2007 |
| WO | 2010140940 A1 | 12/2010 |
| WO | 2011010962 A1 | 1/2011 |

OTHER PUBLICATIONS

Geiser, B.; Kruger, H.; Lollmann, H.W.; Vary, P.; Deming Zhang; Hualin Wan; Hai Ting Li; Deming Zhang, "Candidate proposal for ITU-T super-wideband speech and audio coding," Acoustics, Speech and Signal Processing, 2009. ICASSP 2009. IEEE International Conference on , vol., No., pp. 4121,4124, Apr. 19-24, 2009.*
Raja, A.; Azad, R.M.A.; Flanagan, C.; Ryan, C., "A Methodology for Deriving VoIP Equipment Impairment Factors for a Mixed NB/WB Context," Multimedia, IEEE Transactions on , vol. 10, No. 6, pp. 1046,1058, Oct. 2008.*
Morioka, C.; Kurashima, A.; Takahashi, A., "Proposal on Objective Speech Quality Assessment for Wideband IP Telephony," Acoustics, Speech, and Signal Processing, 2005. Proceedings. (ICASSP '05). IEEE International Conference on , vol. 1, No., pp. 49,52, Mar. 18-23, 2005.*

(Continued)

*Primary Examiner* — Brian Albertalli
(74) *Attorney, Agent, or Firm* — Rothwell, Figg, Ernst & Manbeck P.C.

(57) ABSTRACT

Method and arrangement for processing of a speech quality estimate, which involve adaption of a speech quality estimate based on information related to the bandwidth of a reference signal used when determining said speech quality estimate, such that the adapted speech quality estimate is independent of the bandwidth of the reference signal. The method and arrangement enable objective speech quality measurements or assessments to be performed on a unified bandwidth scale, independent of the bandwidth of a reference signal, which allows e.g. a more relevant comparison of communication systems and/or equipment, such as e.g. codecs.

13 Claims, 8 Drawing Sheets

(56) References Cited

OTHER PUBLICATIONS

Grancharov, V., et al., "Low-Complexity, Nonintrusive Speech Quality Assessment", IEEE Transactions on Audio, Speech, and Language Processing, vol. 14, No. 6, Nov. 1, 2006, IEEE Service Center, New York, NY, USA, pp. 1948-1956, XP003013947.

Lapidus, M., et al., "Enhanced Intrusive Voice Quality Estimation (EVQE)", Electrical and Electronics Engineers in Israel (IEEEI), 2010 IEEE 26th Convention of Nov. 17, 2010, IEEE, Piscataway, NJ, USA, pp. 476-480.

International Search Report issued on Oct. 27, 2011, in corresponding PCT application No. PCT/SE2011/050611, 5 pages.

Written Opinion of the International Searching Authority issued on Oct. 27, 2011, in corresponding PCT application No. PCT/SE2011/050611, 6 pages.

\* cited by examiner

| Bandwidth of degraded signal | Bandwidth of reference signal | | |
|---|---|---|---|
| | NB | WB | SWB |
| NB | NB -> SWB | WB -> SWB | No adjustment |
| WB | - | WB -> SWB | No adjustment |
| SWB | - | - | No adjustment |

# METHOD AND ARRANGEMENT FOR PROCESSING OF SPEECH QUALITY ESTIMATE

This application claims the benefit of U.S. Provisional patent application No. 61/345,255, filed on May 17, 2010, the contents of which are incorporated by reference herein.

TECHNICAL FIELD

The invention relates to a method and an arrangement for processing of a speech quality estimate.

BACKGROUND

Double-ended, or intrusive, algorithms are used in speech quality estimation for providing an objective quality estimation. Double-ended, or intrusive, algorithms for speech quality estimation require access to both a clean reference signal and a degraded, i.e. processed, signal. The degraded signal is derived from the reference signal by the introduction of some distortions e.g. caused by real or emulated transmission or compression system(s). The purpose of objective quality estimation algorithms is to replace subjective listening tests, and thus reduce cost, save time, and allow for continuous network quality monitoring.

The subjective quality level of a communication system is typically set as the Mean Opinion Score (MOS) obtained from a pool of listeners. The most popular quality scale in subjective quality assessments is the five grade scale {1-5}; where 1 corresponds to "bad quality" and 5 corresponds to "excellent quality" [1].

Objective quality estimation is typically performed by standardized algorithms [2]. These algorithms have reference and degraded signals as an input, and output an estimated objective quality level $Q_{obj}$ on an internal objective scale, which does not match exactly the subjective scale $Q_{subj}$, see FIG. 1. Typically, the internal objective scale may be e.g. {0-100} or {−0.5-4.5}, due to e.g. implementation reasons. The objective quality level can be mapped to the subjective scale by use of conventional mapping in a post-processing step. The purpose of this mapping is to produce an output of the quality assessment algorithm in the scale {1-5}, which is commonly used in subjective tests, and therefore well known.

The block "objective quality estimator" 104 in FIG. 1 represents a state-of-the-art speech quality assessment algorithm [2]. An estimate of speech quality is obtained in the following steps: I) pre-filtering, e.g., IRS filter, II) time and gain alignment of reference and degraded signals, III) transform to perceptual domain, e.g., Bark scale followed by compression law, and IV) relating the difference between transformed reference and degraded signals to objective quality.

The test object, e.g. illustrated as the block "communication system" 102 in FIG. 1, can be e.g. a PC simulated speech codec, noise suppressor, etc., or a real network with multiple transcodings, channel errors, and even unknown types of degradations. A typical system under test operates on signals of certain bandwidths, e.g., NB (NarrowBand), WB (WideBand), or SWB (Super WideBand). When a system to be tested operates on signals of a certain bandwidth, this bandwidth is also the expected bandwidth of the degraded signal, which is output from the system. It is not always clear what is meant by SWB, since the term SWB is sometimes used for 14 KHz, sometimes for 16 KHz, and sometimes for the "entire frequency spectrum", i.e. full band. However, here it is assumed that SWB is 14 kHz.

The block "mapping to subjective scale" 106 in FIG. 1 maps the internal objective scale to a five grade subjective scale, e.g., {0-100}->{1-5}; or {−0.5-4.5}->{1-5}. This mapping is linear.

An objective speech quality estimator may allow a test object or system to be evaluated against reference signals of different bandwidths, i.e. the reference signal and the degraded signal may be of different bandwidth, and/or against reference signals having the same bandwidth as the degraded signal. The practice of using reference signals with different bandwidths is related to the evolution of speech communication systems, where wider and wider bandwidths are supported by e.g. speech codecs, while legacy narrowband systems and equipment are still in use.

The quality score of a system being tested against different bandwidths depends on the bandwidth of the reference signal used. It could be distinguished between NB scale, i.e. reference signal of bandwidth 3.5 kHz; WB scale, i.e. reference signal of bandwidth 7 kHz; or SWB scale, i.e. reference signal of bandwidth 14 kHz. It is a problem that the results of speech quality assessment are provided in different bandwidth scales, e.g. when speech quality characteristics of different systems or components are to be compared.

SUMMARY

It is an object of the invention to at least decrease ambiguities caused by multiple different reported and/or measured quality levels for a single communication system.

According to one aspect, a method is provided for processing of a speech quality estimate. The method comprises obtaining a speech quality estimate determined based on a reference signal and a degraded test signal. The method further comprises obtaining information related to the bandwidth of the reference signal used when determining said speech quality estimate. Further, the method involves deriving the bandwidth of the reference signal used when determining said speech quality estimate, and adapting the speech quality estimate based on said bandwidth and a predefined bandwidth, such that the adapted speech quality estimate is independent of the bandwidth of the reference signal. Hereby is achieved that an adaptation of quality estimates to a common scale is enabled.

According to another aspect, an arrangement/apparatus is provided, which is adapted to process speech quality estimates. The arrangement comprises a functional unit, which is adapted to obtain a speech quality estimate and information related to the bandwidth of a reference signal used when determining said speech quality estimate. The arrangement further comprises a functional unit adapted to derive the bandwidth of the reference signal used when determining said speech quality estimate. Further, the arrangement comprises a functional unit adapted to adapt the speech quality estimate based on the bandwidth of the reference signal used when determining the speech quality estimate and a predefined bandwidth, thus providing an adapted speech quality estimate that is independent of the bandwidth of the reference signal used when determining said speech quality estimate.

The above method and arrangement may be used for enabling objective speech quality measurements or assessments to be performed on a unified bandwidth scale, independent of the bandwidth of a reference signal. This allows e.g. a more relevant comparison of communication systems and/or equipment, such as e.g. codecs, having specified speech quality metrics.

The above method and arrangement may be implemented in different embodiments. In some embodiments, the predefined bandwidth is the highest bandwidth in a set of bandwidths used for speech within current speech communication systems. The predefined bandwidth may be a bandwidth in the interval 14-16 kHz, such as e.g. SWB. The method and arrangement could be used in a speech assessment device/tool and the arrangement could be part of such a device.

The speech quality estimate may be adapted by applying a mapping configured as an estimate of experimental speech quality estimation data related to the bandwidth of the reference signal and to the predefined bandwidth. The arrangement may therefore be adapted for applying the mapping. Further, the information related to the bandwidth of the reference signal used when determining said speech quality estimate may comprise e.g. an indicator of the reference signal bandwidth, the explicit reference signal bandwidth, and/or the sampling frequency of the reference signal.

Some embodiments may be adapted to provide the adapted speech quality estimate as an objective speech quality estimate, while some embodiments may be adapted to provide the adapted speech quality estimate as a subjective speech quality estimate.

According to yet another aspect, a computer program product is provided, which comprises a computer program, comprising code means, which when run in an arrangement according to any embodiment described herein, will cause the arrangement to perform a method according to any of the embodiments described herein.

BRIEF DESCRIPTION OF DRAWINGS

The invention will now be described in more detail by means of exemplifying embodiments and with reference to the accompanying drawings, in which.

DETAILED DESCRIPTION

Figure 1:
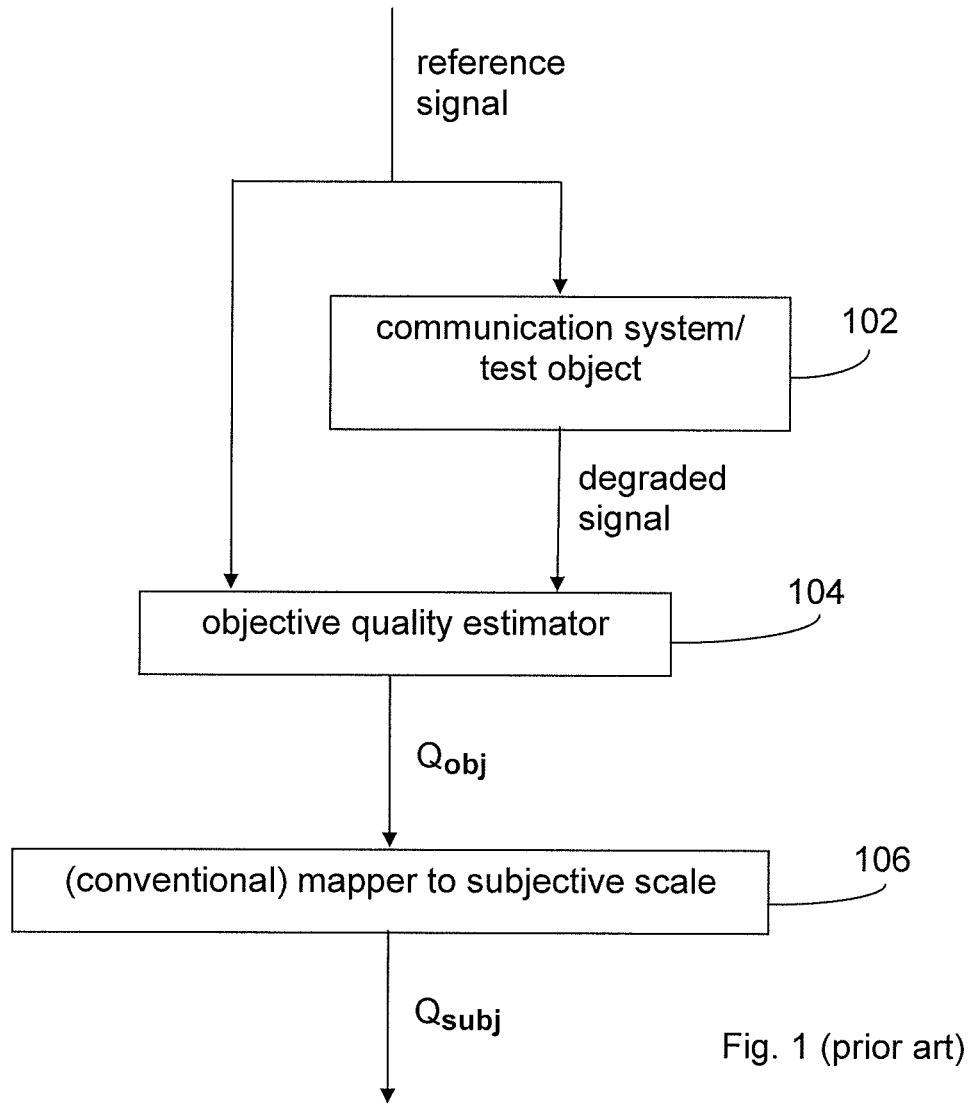
FIG. 1 is a block scheme illustrating an arrangement for speech quality estimation, according to the prior art.

Objective quality methods or tools/devices that allow input signals of variable bandwidth, as in [3], open possibilities for the users to report quality on different scales. This can be illustrated by the following example. Let the system under test be a speech codec AMR-WB (Adaptive Multi-Rate-Wideband), which requires a WB speech reference signal. The "degraded signal" after processing in the system under test will then be WB, i.e. it will have a bandwidth of approximately 7 kHz. If the subjective quality is measured against a WB reference signal, the codec will get a quality level around 4.0. However, if the same codec is tested against an SWB reference signal, it will only get a quality level around 3.5, when using the scale {1-5}. The reason for the quality decrease is the contribution of the bandwidth difference between reference signal and the degraded signal. Such a behavior is unwanted, since the same system is judged as having two different quality levels, which is not the case.

An example of such an algorithm allowing input signals of variable bandwidth could be implemented as follows: First the input reference and degraded signals are compensated for time delay differences and soft gain variations. Next, the signals are transformed into the perceptual domain, i.e. converted to the frequency domain, followed by frequency warping and level compression. On a block-by-block basis, the signal distortions are calculated as a difference between internal representations of the reference signal and the degraded signal. Finally, the per-block signal distortions are aggregated, first over frequency, and then over time, and the per-signal aggregated distortion is mapped to form an estimate of perceived quality.

A trivial solution to the problem of different perceived quality levels of a single system would be to always use an SWB reference signal, and thus always report quality scores in an SWB scale. However, this solution is difficult to implement since: I) SWB reference signals may not always be available, and II) the measurement equipment may not support SWB signals.

Briefly described, the proposed solution is to adapt the objective quality measurement tools/devices to report the measured quality in a unified SWB scale, even in the absence of an SWB reference signal. In this way the ambiguities caused by multiple different reported and/or measured quality levels for a single communication system will be avoided.
Exemplifying Arrangement, FIG. 2a-b Below, an exemplifying embodiment will be described with reference to FIG. 2a. A reference signal, "A", having a certain bandwidth, is provided to a test object 202, which may be e.g. a real or emulated codec or communication system. This is the test object of which the degrading effect on speech is to be assessed. The reference signal A is also provided to a quality estimator 204. The reference signal A is processed by the test object 202, which outputs a degraded version of the reference signal, the signal "B", here also denoted "the degraded signal". The signal B is provided to the quality estimator 204. The quality estimator 204 is adapted to receive a reference signal and a degraded signal, each having a respective bandwidth. The quality estimator 204 is further adapted to compare the degraded signal B to the reference signal A, and to calculate a difference between internal representations of the reference signal and the degraded signal. This could be performed e.g. on a block-by-block basis.

The quality estimator 204 provides an objective quality estimate. This quality estimate will depend on the bandwidth of the reference signal, as previously described. This objective quality estimate is denoted $Q_{obj\_multi\_scale}$ in FIG. 2a. The objective quality estimate $Q_{obj\_multi\_scale}$ is provided to a functional unit or arrangement, here denoted "calculation unit", 206, for adapting or mapping $Q_{obj\_multi\_scale}$ to a common scale, which is independent of a possible difference in bandwidth between the reference signal and degraded signal. The calculation unit 206 is adapted to receive or retrieve an objective quality estimate $Q_{obj\_multi\_scale}$, and a signal "C", comprising information related to the bandwidth of the reference signal A. The calculation unit 206 is further adapted to adapt the quality estimate $Q_{obj\_multi\_scale}$ based on the bandwidth of the reference signal used when determining the quality estimate and a predefined bandwidth, such as e.g. SWB.

The information on the signal bandwidth, i.e. the information related to the bandwidth, of reference signal A can be obtained in different ways. For example, the information related to the bandwidth could be received e.g. in form of input parameter(s), cf. signal C in FIG. 2, to the objective quality measurement tool/device. Alternatively, the information related to the bandwidth of reference signal A could be directly calculated or determined in the block "objective quality estimator" 204, and be provided to the calculation unit 206. The input parameter(s), and thus the information related to the bandwidth of the reference signal, could be e.g. either a "bandwidth flag" or other indicator of the bandwidth; the explicit bandwidth; or the sampling frequency of the signal, from which the bandwidth of the reference signal can be derived. For example, if a signal is sampled at 8 kHz it cannot have a bandwidth wider than 4 kHz, and if a signal is sampled at 16 kHz, it cannot have a bandwidth wider than 8 kHz, and so forth. For example, obtaining the information related to the bandwidth of the reference signal A by direct bandwidth calculation in the objective quality estimator 204, could exploit the fact that a frequency domain representation of the reference signal is readily available in the objective quality estimator 204. Thus, the bandwidth could e.g. be calculated as the largest index of a frequency bin that exceeds a certain energy threshold in said frequency domain representation.

Once the reference signal bandwidth is available to the calculation unit 206, the objective quality estimate $Q_{obj\_multi\_scale}$ may be adapted, or adjusted, based on the actual reference signal bandwidth and a predefined "common" bandwidth. The calculation unit 206 is adapted to perform this adaptation, adjustment or "mapping", and to output an objective quality estimate $Q_{obj(common\_scale)}$, which is adapted to a common bandwidth scale. Accordingly, $Q_{obj\_multi\_scale}$ varies with the bandwidth of the applied reference signal, but $Q_{obj(common\_scale)}$, which is provided on a common SWB scale, does not vary with the bandwidth of the applied reference signal. This adaptation or mapping will be described in more detail further below.

The common-scale objective quality estimate $Q_{obj(common\_scale)}$ could then be provided to a conventional mapping unit 208 for conventional mapping to a subjective scale.

Figure 2A:
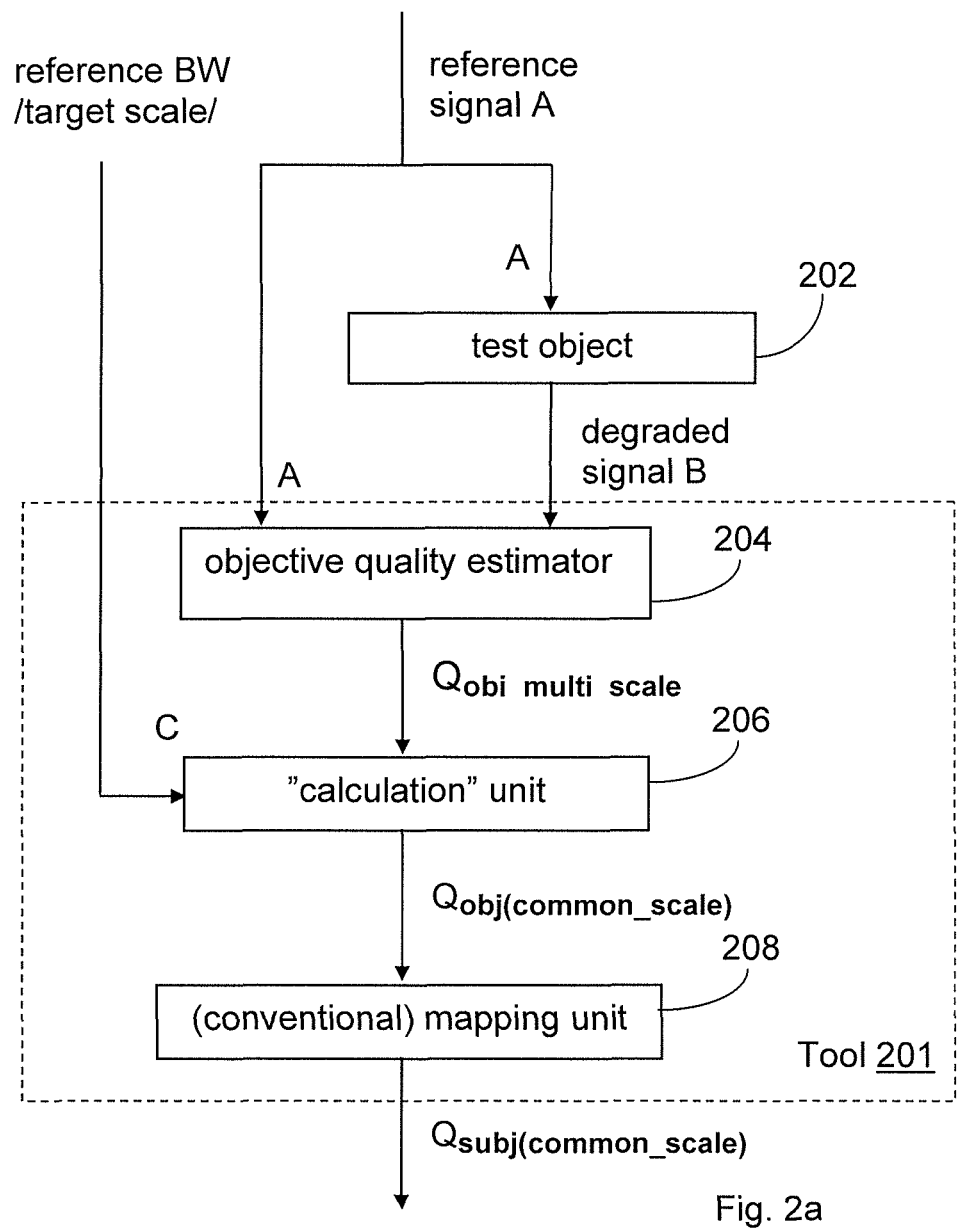
FIGS. 2-3 are block schemes illustrating arrangements for speech quality estimation, according to different exemplifying embodiments.
Figure 2B:
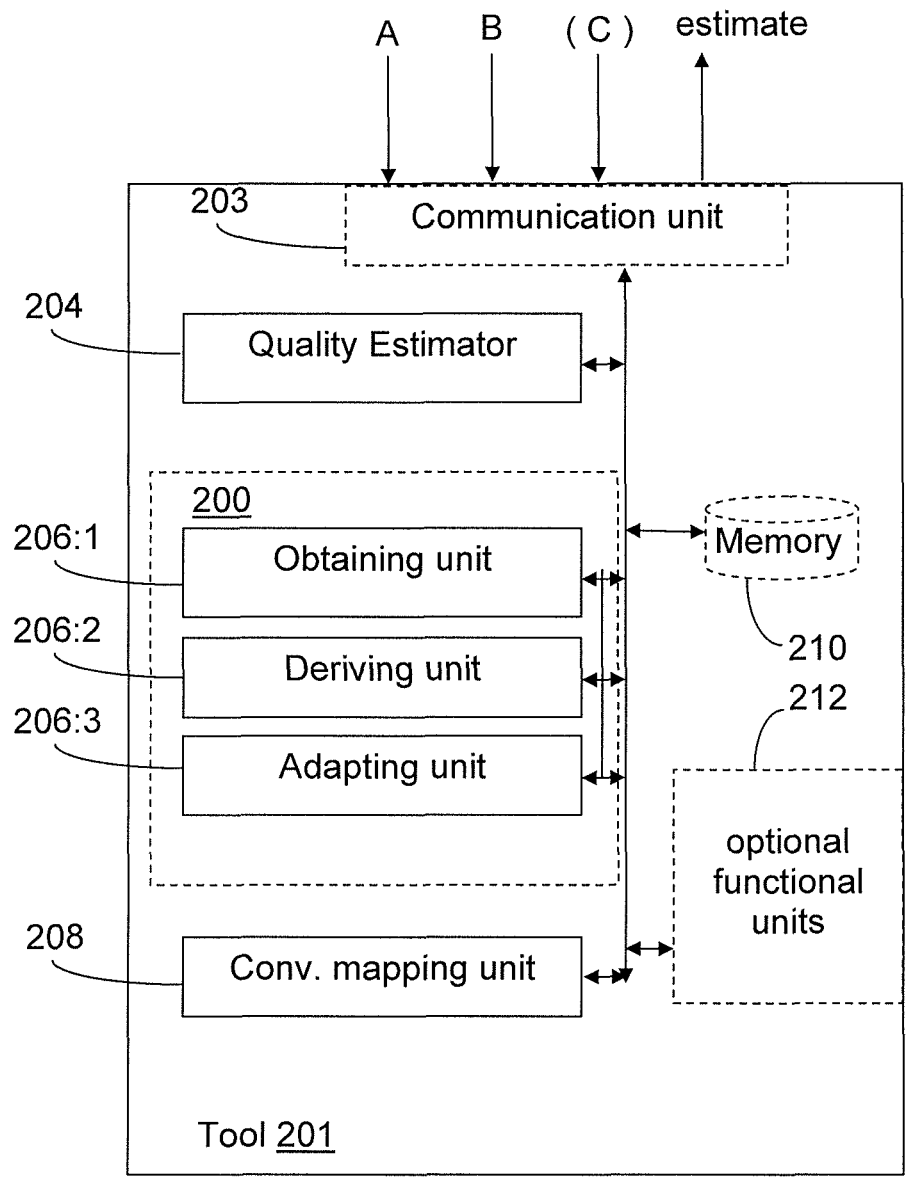

In FIG. 2b, the units 204-208 from FIG. 2a are illustrated as located in a speech assessment device or tool 201. The calculation unit 206 from FIG. 2a has here been illustrated as divided into, or comprising, three units 206:1-206:3 composing an arrangement 200. Alternatively, the units 204 and/or 208 could also be regarded as part of the arrangement 200. The arrangement could be integrated/used as a part or component of a speech quality assessment tool/device or equipment, e.g. in form of a computer, a micro processor and/or one or more integrated circuits.

The arrangement 200 and the device 201 are further illustrated as to communicate with other entities via a communication unit 202, which may be considered to comprise conventional means for signal input and output. The arrangement and/or device 201 may further comprise other optional functional units 212, e.g. for further modification of the speech quality estimate, and may further comprise one or more storage units 210, i.e. memories.

The arrangement 200 comprises an obtaining unit 206:1, which is adapted to obtain a speech quality estimate and information related to the bandwidth of a reference signal used when determining said speech quality estimate. The arrangement further comprises a deriving unit 206:2, which is adapted to derive the bandwidth of the reference signal used when said speech quality estimate was determined. The arrangement further comprises an adapting unit (206:3), adapted to adapt the speech quality estimate based on the bandwidth of the reference signal used when determining the speech quality estimate and a predefined bandwidth, thus providing an adapted speech quality estimate that is independent of the bandwidth of the reference signal used when determining said speech quality estimate.

Figure 4:
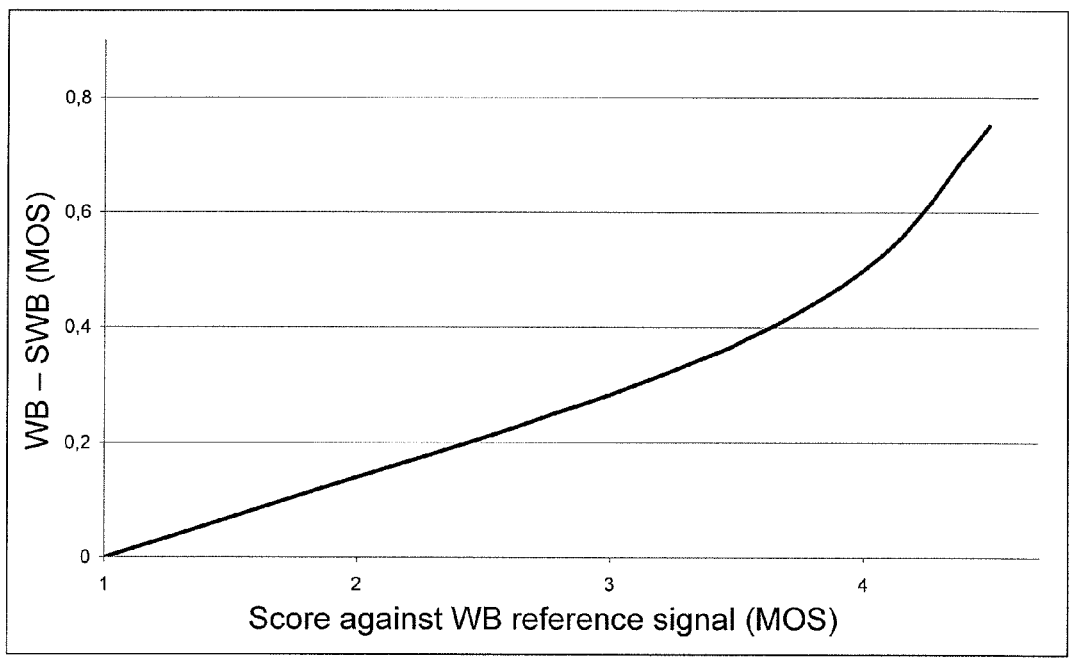
FIG. 4 is a diagram illustrating the difference between quality assessment results in WB and SWB scale.

The adaptation may be performed by applying a mapping configured as an estimate of experimental speech quality estimation data related to the bandwidth of the reference signal and to the predefined bandwidth, e.g. as illustrated in FIG. 4.

Figure 3A:
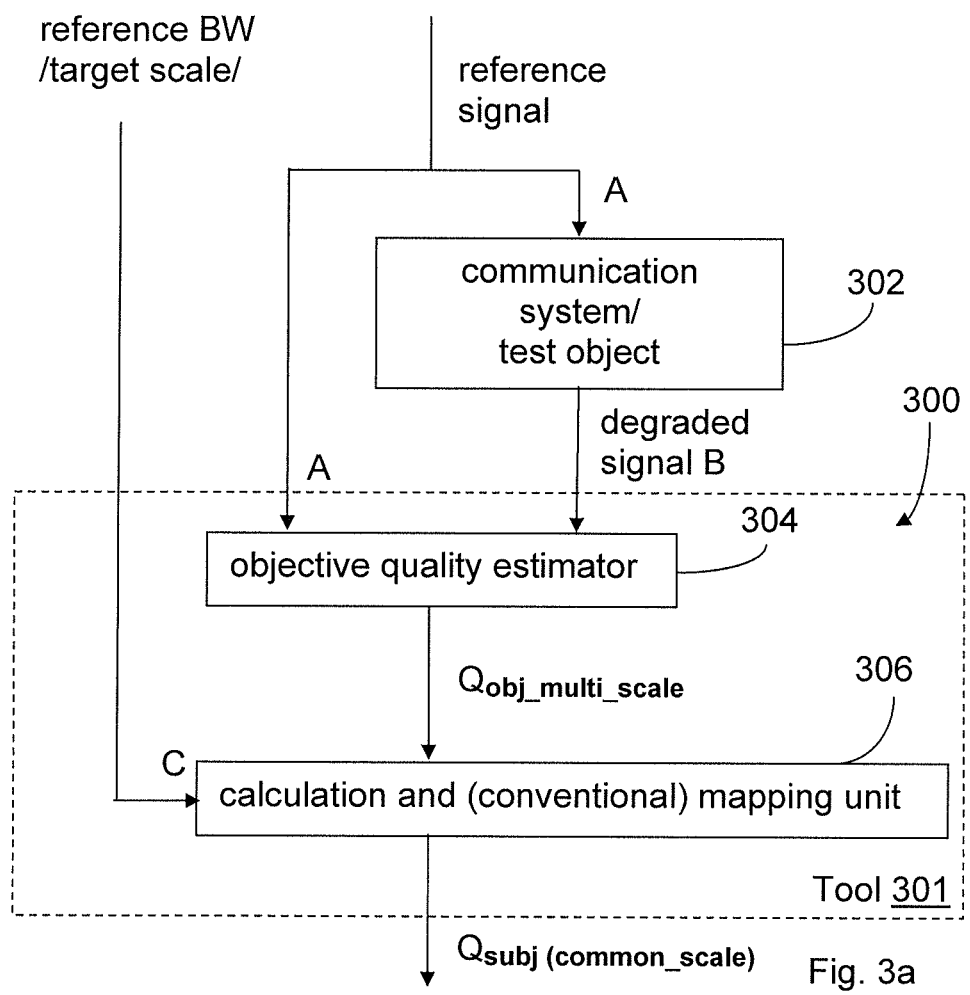
Figure 3B:
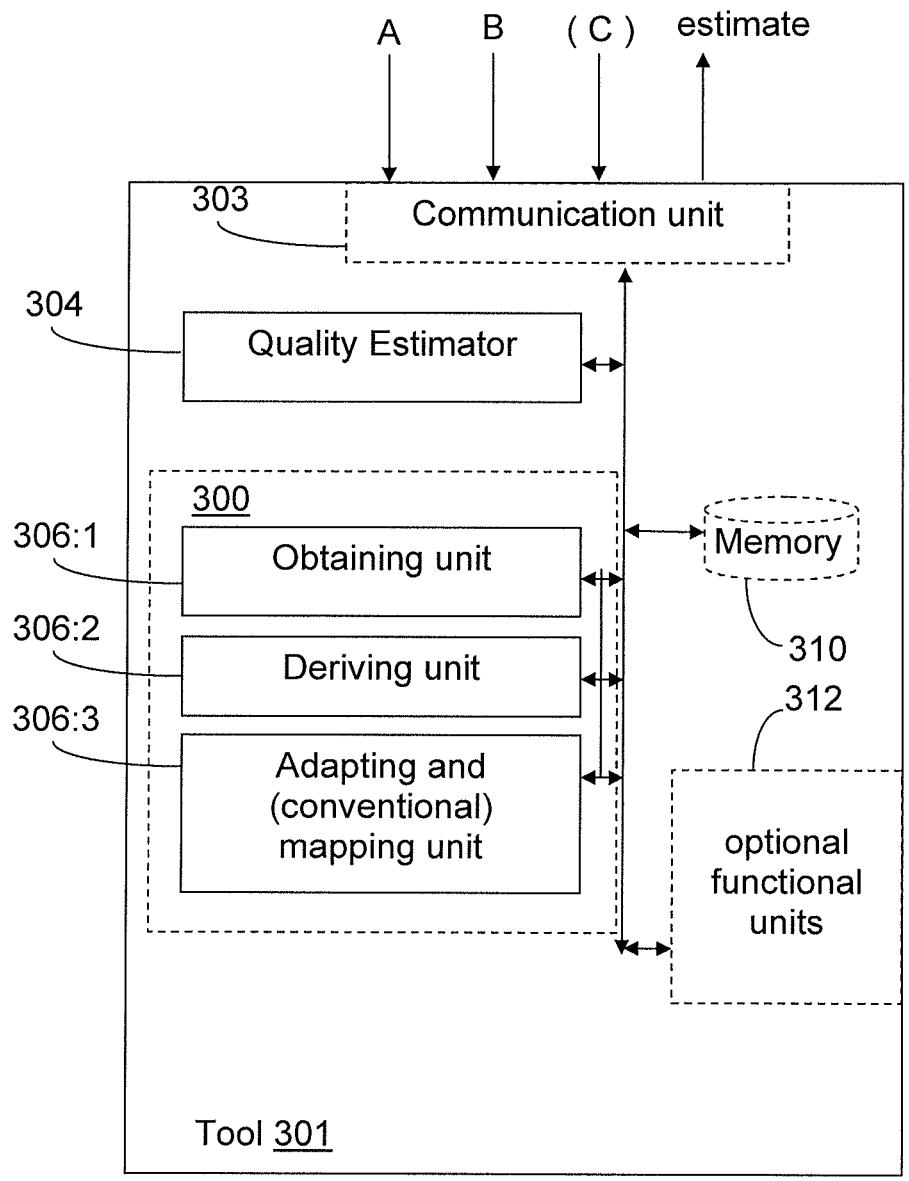

Exemplifying Arrangement, FIG. 3a-b

Below, an exemplifying embodiment adapted to enable the performance of the procedure of processing a speech quality estimate, will be described with reference to FIG. 3a. In the embodiment illustrated in FIG. 3a, the mapping to a common bandwidth scale and the conventional mapping to a subjective scale are combined in a functional unit 306, here denoted "calculation and mapping unit". In this embodiment, the objective "scores" are not explicitly produced or compensated; cf. $Q_{obj(common\_scale)}$ in FIG. 2a. However, the output, $Q_{subj(common\_scale)}$, of the calculation and mapping unit 306 is provided on a common SWB scale.

In FIG. 3b, the units 304 and 306 from FIG. 3a are illustrated as located in a speech assessment device or tool 301. The unit 306 from FIG. 3a has here been illustrated as divided into, or comprising, three units 306:1-306:3 composing an arrangement 300. The unit 306:3 corresponds to an integration of the units 206:3 and 208 in FIG. 2b. Alternatively, the unit 304 could also be regarded as part of the arrangement 300.

The arrangement 300 and/or the tool 301 are further illustrated as to communicate with other entities via a communication unit 302, which may be considered to comprise conventional means for signal input and output. The arrangement and/or tool may further comprise other optional functional units 312, e.g. for further modification of the speech quality estimate, and may further comprise one or more storage units 310.

Figure 5:
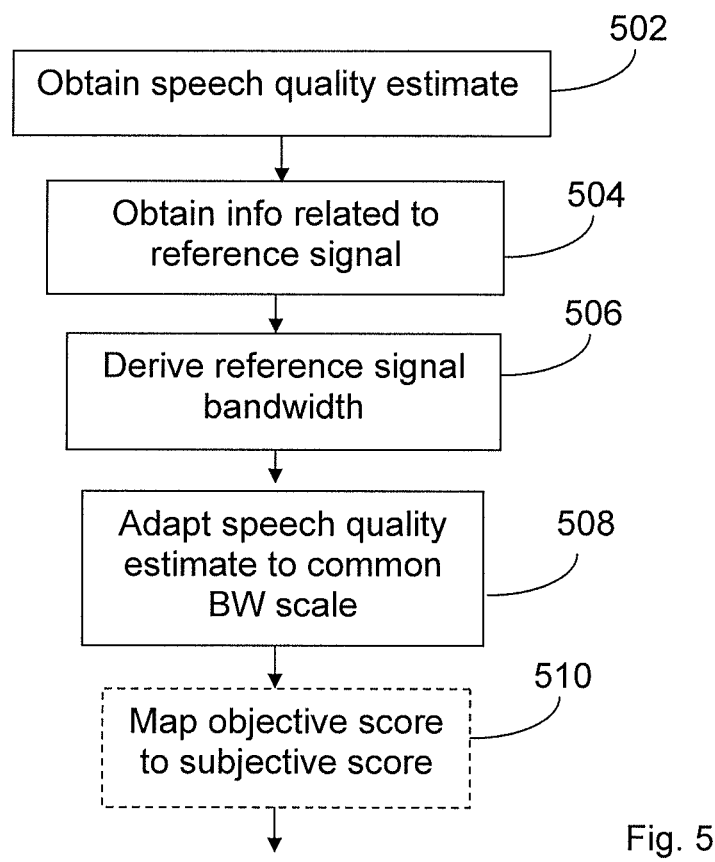
FIG. 5 is a flow chart illustrating a procedure, according to an exemplifying embodiment.

Exemplifying Procedure, FIG. 5

An exemplifying procedure of processing a speech quality estimate could be described as follows, with reference to FIG. 5. The method is performed by a speech assessment device or an arrangement in a speech assessment device. A speech quality estimate or score determined based on a reference signal and a degraded test signal, is obtained in an action 502. Further, information related to the bandwidth of the reference signal used when determining said speech quality estimate is obtained in an action 504. The information related to the bandwidth could be received e.g. in form of input parameter(s) such as an indicator of the reference signal bandwidth; the explicit reference signal bandwidth, and/or the sampling frequency of the reference signal. Further, the bandwidth used when determining said speech quality estimate is derived in an action 506, based on the obtained information.

Then, the speech quality estimate or score is adapted to a common scale, e.g. an SWB scale, in an action 508, based on the bandwidth of the reference signal used when determining said speech quality estimate, and a predefined bandwidth, or "common" bandwidth, such that the adapted speech quality estimate is independent of the bandwidth of the reference signal. The predefined bandwidth could be e.g. a bandwidth in the interval 14-16 kHz and/or the highest bandwidth in a set of bandwidths used for speech within current speech communication systems.

The common-scale speech quality estimate may then further be conventionally mapped into a subjective scale in an action 510. Alternatively such mapping could be performed in conjunction with the adaptation to a common scale in a joint action.

Common Bandwidth Scale

Figures 6, 7:
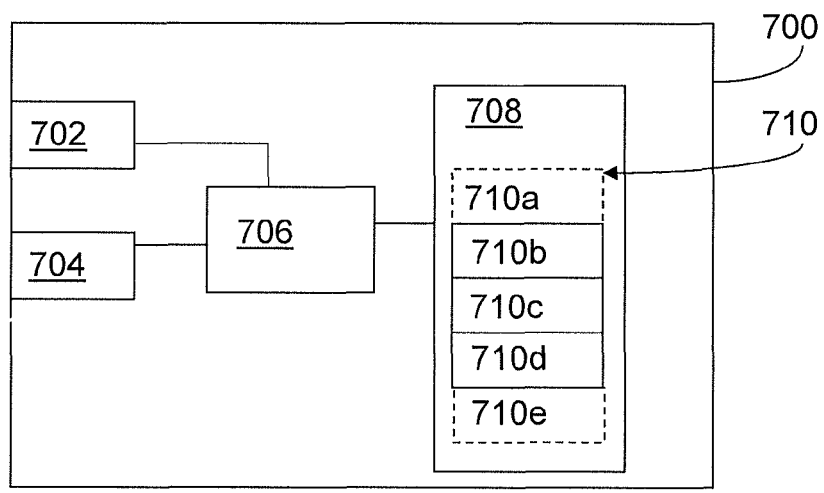
FIG. 6 is a diagram illustrating the adaptation which should be performed depending on the bandwidths of the reference signal and the degraded signal, according to an exemplifying embodiment.
FIG. 7 is a schematic view illustrating an arrangement for speech quality estimation, according to an exemplifying embodiment.

The adaptation, adjustment or "mapping", to a common bandwidth scale, such as e.g. the mapping $Q_{obj\_multi\_scale} \rightarrow Q_{obj(common\_scale)}$, as is mentioned with respect to FIG. 2. The mapping discussed here should not be confused with the "conventional mapping" to a common numerical scale, e.g. {1-5}, which do not depend of the bandwidth of a reference signal. In the mapping to a common bandwidth scale, mapping coefficients $\{a_j\}$, could be used. The mapping coefficients would depend on the bandwidth of the reference signal, since different mappings should be used depending on the bandwidth of the reference signal that is used when determining the original quality estimate $Q_{obj\_multi\_scale}$. For example, if a NB reference signal is used, the mapping will be different than when a WB reference signal is used. If the reference signal is SWB, no mapping to a common bandwidth scale is needed, since the result will already be in an SWB scale. A table of different mappings is illustrated in FIG. 6.

Examples of possible adjustments or mappings are e.g. polynomial and sigmoid mappings, defined as:

$$y = a_3 x^3 + a_2 x^2 + a_1 x + a_0,$$

and $$y = \frac{a_3}{1 + e^{-a_2 x + a_1}} + a_0,$$

where $$x = Q_{obj\_multi\_scale},$$

and depending on the selected scheme, e.g. the scheme illustrated in FIG. 2 or FIG. 3:

$$y = Q_{subj(common\_scale)} \text{ or } Q_{obj(common\_scale)}$$

The mapping to a common bandwidth scale can be implemented in different ways. However, the mapping should try to emulate a behavior e.g. as the one illustrated in FIG. 4, i.e. the variations in the result of subjective quality assessments depending on the bandwidth of a reference signal. Experimental data, used to create FIG. 4, shows that WB and SWB scales cannot be related with a simple offset. High-quality systems gain up to 0.7 MOS being scored in WB instead of SWB scale, while the difference approaches zero for low-quality systems. For example, a system that gets the score 1 MOS in WB scale, will also get the score 1 MOS in SWB scale, i.e. "bad quality".

Thus, in other words, the mapping to a common bandwidth scale could be implemented e.g. by use of a polynomial or sigmoid mapping, such as the ones described above, configured to estimate or imitate the behavior of experimental data valid for the type of mapping to be performed, e.g. mapping from WB to SWB.

FIG. 4 illustrates the difference between the subjective quality estimates given for different systems, where each respective system is evaluated using two different reference signals: a WB reference signal and an SWB reference signal. The subjective scores given when the reference signal is a WB signal are shown on the x-axis. On the y-axis, it can be read out how much higher the subjective score was when the reference signal was a WB signal as compared to when the reference signal was an SWB signal, i.e. when the result for an SWT reference signal is subtracted from the result for a WB signal. For example, a system which received a subjective speech quality estimate of 3 MOS for a WB reference signal, received a subjective speech quality estimate, which was approximately 0.3 MOS higher when the reference signal was a WB signal than when the reference signal was an SWB signal.

In order to provide a similar mapping from NB to SWB, experimental data could be collected from tests of different systems being evaluated using different reference signals: an NB reference signal and an SWB reference signal. The mapping could then be derived from the experimental data, as previously described.

It should be noted that FIGS. 2 and 3 merely illustrate various functional units of the arrangements 200 and 300 in a logical sense. The functional units could also be denoted e.g. "modules" or "circuits", or be parts of circuits. However, the skilled person is free to implement these functions in practice using any suitable software and/or hardware means, such as e.g. ASICs (Application-Specific Integrated Circuit), FPGAs (Field-Programmable Gate Array) and DSPs (Digital Signal Processor). Thus, the invention is generally not limited to the shown structure of the arrangements 200 and 300.

Exemplifying Embodiment, FIG. 7

FIG. 7 schematically shows an embodiment of an arrangement 700 suitable for use in an objective quality measurement device or tool, which also can be an alternative way of disclosing an embodiment of the arrangements for use in an objective quality measurement device or tool illustrated in FIG. 2a-3b. Comprised in the arrangement 700 are here a processing unit 706, e.g. with a DSP (Digital Signal Processor). The processing unit 706 can be a single unit or a plurality of units to perform different steps of procedures described herein. The arrangement 700 also comprises the input unit 702 for receiving signals, such as a reference signal in a clean and a degraded version, and the output unit 704 for output signal(s), such as a quality estimate. The input unit 702 and the output unit 704 may be arranged as one in the hardware of the arrangement.

Furthermore the arrangement 700 comprises at least one computer program product 708 in the form of a non-volatile memory, e.g. an EEPROM, a flash memory and a hard drive. The computer program product 708 comprises a computer program 710, which comprises code means, which when run in the processing unit 706 in the arrangement 700 causes the arrangement and/or the measurement tool to perform the actions of the procedure described earlier in conjunction with FIG. 5.

Hence in the exemplifying embodiments described, the code means in the computer program 710 of the arrangement 700 may comprise a determining module 710a for determining an objective speech quality estimate given a reference signal and a degraded version of said reference signal (a test signal). The computer program comprises an obtaining module 710b for obtaining a speech quality estimate and information related to the reference signal used when the speech quality estimate was determined. The computer program further comprises a deriving module 710c for deriving the bandwidth of the reference signal. Further, the computer program comprises a mapping or adapting unit 710d for adapting the speech quality estimate to a common scale, e.g. SWB. The computer program could further comprise another conventional mapping module 710e for mapping the adapted objective speech quality estimate to a subjective speech quality estimate. The computer program 710 is in the form of computer program code structured in computer program modules. The modules 710b-e essentially perform the actions of the flow illustrated in FIG. 5 to emulate the arrangement in an objective quality measurement device or tool illustrated in FIG. 2. In other words, when the different modules 710a-e are run on the processing unit 706, they correspond to the units 204-208 of FIG. 2b. The computer program modules 710d and 710e could be integrated into a module for determining a subjective quality estimate in a common scale, which would emulate the unit 306:3 illustrated in FIG. 3b.

Although the code means in the embodiment disclosed above in conjunction with FIG. 7 are implemented as computer program modules which when run on the processing unit causes the arrangement and/or objective quality measurement tool to perform steps described above in the conjunction with figures mentioned above, at least one of the code means may in alternative embodiments be implemented at least partly as hardware circuits.

Some Remarks

While the invention has been described with reference to specific example embodiments, the description is in general only intended to illustrate the inventive concept and should not be taken as limiting the scope of the invention. The different features of the exemplifying embodiments above may be combined in different ways according to need, requirements or preference. The invention is defined by the following independent claims.

Abbreviations

BW—bandwidth

IRS—intermediate reference system

MOS—mean opinion score

NB signal—NarrowBand: no frequency components above 4 kHz

WB signal—WideBand: no frequency components above 7 kHz

SWB signal—Super WideBand: no frequency components above 14 kHz

References

[1] ITU-T Rec. P.800, Methods for Subjective Determination of Transmission Quality, 1996

[2] ITU-T Rec. P.862.2, Wideband extension to recommendation P.862 for the assessment of wideband telephone networks and speech codecs, 2005

[3] ITU-T Rec. P.863, Perceptual objective listening quality assessment (POLQA), 2011

The invention claimed is:

1. A computer-implemented method for processing of a speech quality estimate, comprising:
   obtaining a speech quality estimate determined based on a reference signal and a degraded test signal,
   obtaining information related to the bandwidth of the reference signal used when determining said speech quality estimate,
   deriving, with a computer processor, the bandwidth of the reference signal used when determining said speech quality estimate, and
   adapting, with a computer processor, the speech quality estimate based on the bandwidth of the reference signal used when determining said speech quality estimate and a predefined bandwidth such that the adapted speech quality estimate is independent of the bandwidth of the reference signal.

2. The method according to claim 1, wherein the predefined bandwidth is 16kHz.

3. The method according to claim 1, wherein the predefined bandwidth is 14kHz.

4. The method according to claim 1, wherein the predefined bandwidth lies within the interval 14-16 kHz.

5. The method according to claim 1, wherein the adapting step comprises applying a mapping configured as an estimate of experimental speech quality estimation data related to the bandwidth of the reference signal and to the predefined bandwidth.

6. The method according to claim 1, wherein the speech quality estimate is an objective speech quality estimate.

7. The method according to claim 1, wherein the adapted speech quality estimate is an objective speech quality estimate or a subjective speech quality estimate.

8. The method according to claim 1, wherein the information related to the bandwidth of the reference signal used when determining said speech quality estimate comprises at least one of:
   an indicator of the reference signal bandwidth,
   the explicit reference signal bandwidth, and
   the sampling frequency of the reference signal.

9. An arrangement for processing a speech quality estimate, comprising:
   an obtaining unit, adapted to obtain a speech quality estimate and information related to the bandwidth of a reference signal used when determining said speech quality estimate,
   a deriving unit, adapted to derive, with a computer processor, the bandwidth of the reference signal used when determining said speech quality estimate, and
   an adapting unit, adapted to adapt with a computer processor, the speech quality estimate based on the bandwidth of the reference signal used when determining the speech quality estimate and a predefined bandwidth such that an adapted speech quality estimate is independent of the bandwidth of the reference signal used when determining said speech quality estimate.

10. The arrangement according to claim 9, wherein the adapting unit is configured to perform the adaptation by applying a mapping configured as an estimate of experimental speech quality estimation data related to the bandwidth of the reference signal and to the predefined bandwidth.

11. The arrangement according to claim 9, wherein the adapted speech quality estimate is an objective speech quality estimate or a subjective speech quality estimate.

12. A speech assessment device, comprising an arrangement according to claim 9.

13. A non-transitory computer program product, comprising a computer program, comprising computer readable code means, which when executed by a computing device causes the computing device to perform the method according to claim 1.

* * * * *